United States Patent
Gulaka et al.

(10) Patent No.: US 9,799,115 B2
(45) Date of Patent: Oct. 24, 2017

(54) APPARATUS AND METHOD FOR AUTOMATICALLY REGISTERING LANDMARKS IN THREE-DIMENSIONAL MEDICAL IMAGE

(71) Applicant: SAMSUNG ELECTRONICS CO., LTD., Suwon-si (KR)

(72) Inventors: Praveen Gulaka, Moscow (RU); Alexey Bronislavovich Danilevich, Moscow (RU); Dmitry Alexandrovich Korobchenko, Moscow (RU); Mikhail Nikolaevich Rychagov, Moscow (RU); Mikhail Yurievich Sirotenko, Moscow (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 70 days.

(21) Appl. No.: 14/778,391

(22) PCT Filed: Mar. 18, 2014

(86) PCT No.: PCT/KR2014/002292
§ 371 (c)(1),
(2) Date: Sep. 18, 2015

(87) PCT Pub. No.: WO2014/148806
PCT Pub. Date: Sep. 25, 2014

(65) Prior Publication Data
US 2016/0284089 A1   Sep. 29, 2016

(30) Foreign Application Priority Data
Mar. 18, 2013   (RU) .................................. 2013111932

(51) Int. Cl.
*G06K 9/00* (2006.01)
*G06T 7/00* (2017.01)
*G06T 7/33* (2017.01)

(52) U.S. Cl.
CPC .......... *G06T 7/0028* (2013.01); *G06T 7/0012* (2013.01); *G06T 7/33* (2017.01);
(Continued)

(58) Field of Classification Search
None
See application file for complete search history.

(56) References Cited

U.S. PATENT DOCUMENTS 8,160,322 B2   4/2012   Dikmen et al.
8,218,849 B2   7/2012   Lu et al.
(Continued)

FOREIGN PATENT DOCUMENTS

JP   2003-180679 A   7/2003
JP   2011-244939 A   12/2011
(Continued)

OTHER PUBLICATIONS

Communication dated May 13, 2014 issued by Federal Service of Intellectual Property Office in counterpart Russian Application No. 2013111932/08 (017667).
(Continued)

*Primary Examiner* — Weiwen Yang
(74) *Attorney, Agent, or Firm* — Sughrue Mion, PLLC

(57) ABSTRACT

A method of automatically registering landmarks in a 3-dimensional (3D) medical image includes obtaining a 3D image; determining a set of search points based on a statistical atlas attached to a bounding box corresponding to a part of the 3D image; extracting features of the determined set of search points; forming a set of candidates for a landmark based on the extracted features; filtering the can-
(Continued)

didates and outputting remaining candidates among the candidates based on the filtering; and outputting a final position of the landmark based on one of the remaining candidates.

20 Claims, 8 Drawing Sheets

(52) U.S. Cl.
CPC ...... *G06T 2200/04* (2013.01); *G06T 2207/10072* (2013.01); *G06T 2207/10081* (2013.01); *G06T 2207/10088* (2013.01); *G06T 2207/10104* (2013.01); *G06T 2207/20024* (2013.01); *G06T 2207/20076* (2013.01); *G06T 2207/20081* (2013.01); *G06T 2207/30204* (2013.01)

(56) References Cited

U.S. PATENT DOCUMENTS

| | | | |
|---|---|---|---|
| 2005/0078857 | A1 | 4/2005 | Park |
| 2009/0034813 | A1 | 2/2009 | Dikmen et al. |
| 2009/0096790 | A1* | 4/2009 | Wiedemann ....... G06K 9/00201 345/427 |
| 2009/0306497 | A1 | 12/2009 | Manzke et al. |
| 2010/0061601 | A1 | 3/2010 | Abramoff et al. |
| 2010/0067764 | A1 | 3/2010 | Lu et al. |
| 2010/0119137 | A1 | 5/2010 | Schwing et al. |
| 2010/0254582 | A1 | 10/2010 | Liu et al. |
| 2012/0029337 | A1 | 2/2012 | Aoyagi |
| 2012/0070049 | A1* | 3/2012 | Iwase ........................ G06T 7/62 382/128 |
| 2012/0253170 | A1 | 10/2012 | Kim et al. |
| 2013/0044927 | A1 | 2/2013 | Poole |
| 2013/0057547 | A1 | 3/2013 | Hwang et al. |

FOREIGN PATENT DOCUMENTS

| | | |
|---|---|---|
| KR | 10-2009-0010995 A | 1/2009 |
| KR | 10-2012-0111871 A | 10/2012 |
| KR | 10-2013-0026041 A | 3/2013 |
| RU | 120799 U1 | 9/2012 |
| WO | 01/43070 A2 | 6/2001 |
| WO | 02/43003 A1 | 5/2002 |

OTHER PUBLICATIONS

Written Opinion dated Jun. 25, 2014 issued by the International Searching Authority in counterpart International Patent Application No. PCT/KR2014/002292 (PCT/ISA/237).
Search Report dated Jun. 25, 2014 issued by the International Searching Authority in counterpart International Patent Application No. PCT/KR2014/002292 (PCT/ISA/210).
Communication dated May 19, 2015 issued by the Korean Intellectual Property Office in counterpart Korean Patent Application No. 10-2014-0031858.
Communication dated Oct. 26, 2016 issued by European Patent Office in counterpart European Patent Application No. 14767323.0.

* cited by examiner

APPARATUS AND METHOD FOR AUTOMATICALLY REGISTERING LANDMARKS IN THREE-DIMENSIONAL MEDICAL IMAGE

CROSS REFERENCE TO RELATED APPLICATIONS

This application is a National Stage of International Application No. PCT/KR2014/002292, filed on Mar. 18, 2014, claiming priority based on Russian Application No. 2013111932 filed on Mar. 18, 2013, filed at the Russian Patent Office, the contents of all of which are incorporated herein by reference in their entireties.

TECHNICAL FIELD

The exemplary embodiments relate to a medical device, and in particular, to an apparatus and method for automatic registration of landmarks in a medical image.

BACKGROUND OF THE RELATED ART

Automatic registration of landmarks in a medical image is usually performed by performing a computing method on a computer. Examples of such methods use an algorithm adjusted manually for detection of specific anatomic structures or points (landmarks). In other methods, the approach is based on machine learning for construction of a detector, which is capable of providing detection of position of anatomic structures or points. A typical method for registration of landmarks in an image includes scanning of an image by using a window and classifying window content according to a position for the purpose of investigation of a position of an anatomic structure. Various known algorithms can be applied for the solution of a task of classification of such methods, for example, using Markovian networks, using boosting, or extracting features of a general purpose (such as Haar's features).

A first related art technique involves a method of registering anatomic structures using machine learning. The main idea of this related art method is that the cascade of classifiers is applied to selected fragments of an image for verification of the presence of some anatomic points (landmarks) in a concrete position. Classifiers use the various fixed spatial features. The final procedure of classification is constructed using a boosting method. After classification, all candidates go through the procedure of verification which is performed using spatial statistical information taken from a learning sample. In addition, candidates are filtered based on their quality using fixed thresholds. Feature extraction algorithm is adjusted using guided learning.

A second related art technique involves a method of automatically registering landmarks using a combined context. The combined context refers to the set of features of combinations of some landmarks constructed by possible positions of separately taken landmarks. In the first stage, formation of candidates for landmarks is performed by application of learning in the limited subspace and using of a probability boosting tree. In the method, the position, orientation and scale are estimated according to the following steps: a) a trained classifier is applied for estimation of a position, b) a trained classifier is applied for estimation of a position and orientation, and c) a trained classifier is applied for estimation of a scale. Haar's features are used as low-level features. Selection of the best candidates for landmarks is performed by taking into account probability of occurrence of each separate point and the probability corresponding to a combined context of some combination of landmarks (for example, a pair of points in case it is necessary or desired to find landmarks of two types). The second related art technique is discloses in a patent for registration of a heart cap and basal plane on magnetic resonance images of heart.

A third related art technique involves a method of registering landmarks, which is similar to the second related art technique, except that, in the third related art technique, a geometrical model considering relative positions of landmarks is additionally used. An initial position of a first landmark is estimated by using the above described method using learning in a limited subspace. Then, a geometrical model, learned in marked medical images, is assigned to a position of the first landmark. Thus, search zones of other types of anatomic points are set. Positions of other landmarks are determined inside zones obtained by the method described above using learning in a limited subspace. Classification is performed using a probability boosting tree. An applicable field for the third related art technique is magnetic resonance images of a brain.

A fourth related art technique involves a method of automatically registering landmarks in 3D medical images. In the method, the registration is performed by selection of candidates for landmarks and construction of binary connections between the selected candidates. Registration of candidates is performed by using classification of features formed based on spatial histograms. Then, determination of the best candidates is performed by application of a model of Markovian networks to a related set of candidates.

Drawbacks of these methods are as follows. Most algorithms are capable of working with only two-dimensional medical images. Accordingly, such algorithms are applicable to a limited field. Some methods operate with only high-quality medical images of high resolution which is generated for a long period of time. Practically, in all of these methods, feature extraction algorithm is applied for a solution of a classification task. Generally, feature extraction algorithm is adjusted manually using the empirical information. In specific cases, trained models of feature extraction algorithm having a general purpose are used without taking into account specificity of the used data. In such situations, the potential of the approach of machine learning is not fully realized. Also, only one level of features is constructed frequently, instead of constructing a multilevel hierarchy of features. In some approaches, candidates for landmarks are filtered by using corresponding thresholds, however, such thresholds are also adjusted manually as a rule.

SUMMARY

Exemplary embodiments provide an improved approach to automatic registration of landmarks in three-dimensional (3D) medical images, which allows detecting positions of unique points within the limits of each type of such points, and also positions of several points for each of these types.

These technical results may be achieved due to development of a method and a system, based on the method, for automatic registration of landmarks in 3D medical images according to exemplary embodiments.

According to an exemplary embodiment, there is provided a method of automatically registering landmarks in a 3-dimensional (3D) medical image, the method including: obtaining a 3D image; determining a set of search points based on a statistical atlas attached to a bounding box corresponding to a part of the 3D image; extracting features of the determined set of search points; forming a set of candidates for a landmark based on the extracted features; filtering the candidates and outputting remaining candidates among the candidates based on the filtering; and outputting a final position of the landmark based on one of the remaining candidates.

The determining of the set of search points may include setting a grid of search points inside the 3D image based on the statistical atlas.

The extracting of the features of the determined set of search points may include selecting a context around each of the search points, and applying a multilayered feature extraction algorithm to the context.

The forming of the set of candidates may include computing a type of each of the landmarks and a quality measure with respect to each of the search points based on an output of the multilayered feature extraction algorithm.

The filtering of the candidates may include filtering the candidates based on the statistical atlas and pre-computed thresholds for a quality measure indicating a probability that a search point belongs to a landmark.

The outputting of the final position may include: sorting the remaining candidates, remaining after the filtering, within limits of types of landmarks, according to qualities of the remaining candidates, and outputting candidates, among the sorted candidates, having largest values of a quality measure or a determined number of candidates, among the sorted candidates having the largest values of a quality measure.

The method may further include estimating the bounding box based on integral projection of a 3D image onto coordinate axes.

The method may further include forming the statistical atlas based on positions of landmarks in a marked 3D medical image.

The selecting of the context around each of the search points may include selecting a subarea in the 3D image, the subarea having a center located at a predetermined point.

The selecting of the context around each of the search points may include selecting three orthogonal sections of the 3D image which pass through the given point.

The multilayered feature extraction algorithm may include feature extraction layers, concentrating layers, and normalizing layers.

The method may further include obtaining the multilayered feature extraction algorithm based on a learning procedure.

The learning procedure may include: preprocessing and marking a set of 3D medical images; forming a learning base based on the set of marked 3D medical images; initializing layers, responsible for extraction of features, in the multilayered feature extraction algorithm by performing learning without a teacher; and performing learning with a teacher on a model of the multilayered feature extraction algorithm based on the set of marked 3D medical images.

The forming of the learning base may include combining precedents that do not correspond to any types of landmarks corresponding to randomly selected positions in a 3D image and precedents that correspond to landmarks corresponding to positions in a marked 3D image.

The forming of the learning base may include inserting precedents, obtained by application of spatial distortions, into the learning base.

The performing of the learning without a teacher may include searching optimum weights of layers, responsible for the extraction of features, in the feature extraction algorithm, so that outputs of the feature extraction algorithm differ from outputs of corresponding sparse encoders, the sparse encoders may be obtained by application of sparse coding, the application of the sparse coding may include searching an optimum dictionary of basic elements; and the sparse encoders may output expansion coefficients of an input based on the basic elements.

The performing of the learning with a teacher may be based on a stochastic gradient descent method.

The filtering of candidates may be performed based on statistical information obtained from the statistical atlas.

Thresholds for the quality measure are computed by minimizing a loss function, wherein first and second types of errors are part of the loss function.

According to another aspect of an exemplary embodiment, there is provided an apparatus configured to perform automatic registration of landmarks in a 3D medical image, the apparatus including: a storage device configured to store a program; and a CPU connected to the storage device, the CPU being configured to execute the program and thereby cause the apparatus to: estimate a bounding box corresponding to an investigated part of a body inside an obtained 3D medical image, attach a statistical atlas to the bounding box, determine search points inside the obtained 3D medical image based on the statistical atlas, select a context around each of the search points based on a grid of the search points, apply a multilayered feature extraction algorithm to the selected context, form a set of candidates for landmarks by computing a quality measure for each of the search points and for types of the landmarks, based on a corresponding output of the multilayered feature extraction algorithm, filter the candidates based on the statistical atlas and pre-computed thresholds and output remaining candidates among the candidates based on the filtering, sort the remaining candidates within limits of each type of the landmarks according to qualities of the landmarks, and output candidates, among the sorted candidates, having largest values of a quality measure or output a demanded number of candidates, among the sorted candidates, having the largest values of a quality measure.

The apparatus may be configured to estimate the bounding box based on integral projection of a 3D image onto coordinate axes.

The apparatus may be configured to form the statistical atlas based on positions of landmarks in marked 3D medical images.

The apparatus may be configured to select the context around each of the search points by selecting a subarea in a 3D medical image, the subarea having a center located at a predetermined point.

The apparatus may be configured to select the context around each of the search points by selecting three orthogonal sections of the 3D medical image which pass through the predetermined point.

The multilayered feature extraction algorithm may include feature extraction layers, concentrating layers, and normalizing layers.

The apparatus may be configured to obtain the multilayered feature extraction algorithm based on a learning procedure.

The learning procedure may include: preprocessing and marking a set of 3D medical images; forming a learning base based on the set of marked 3D medical images; initializing layers, responsible for feature extraction, in a feature extraction algorithm by performing learning without a teacher; and performing learning with a teacher on a model of the multilayered feature extraction algorithm, using the marked set of 3D medical images.

The apparatus may be configured to perform the forming of the learning base by combining precedents that do not correspond to any types of landmarks corresponding to randomly selected positions in a 3D image and precedents that correspond to landmarks corresponding to positions in one of the marked 3D medical images.

The apparatus may be configured to form the learning base by inserting precedents, obtained by application of spatial distortions, into the learning base.

The apparatus may be configured to perform the learning without a teacher by searching optimum weights of layers, responsible for feature extraction, in the multilayered feature extraction algorithm, so that outputs of the multilayered feature extraction algorithm differ from outputs of corresponding sparse encoders, the apparatus may be configured to obtain the sparse encoders by application of sparse coding, the application of the sparse coding includes searching for an optimum dictionary of basic elements; and the sparse encoders may output expansion coefficients of an input based on the basic elements.

The apparatus may be configured to perform the learning with a teacher based on a stochastic gradient descent method.

The apparatus may be configured to filter the candidates based on statistical information obtained from the statistical atlas so as to filter candidates having statistically incorrect positions.

The apparatus may be configured to compute thresholds for the quality measure by minimizing a loss function, wherein first and second types of errors are part of the loss function.

According to another aspect of an exemplary embodiment, there is provided a non-transitory computer readable recording medium including instructions which, when executed by a computer for automatic registration of landmarks in 3D medical images, cause a CPU of the computer to execute a method including: estimating a bounding box corresponding to an investigated part of a body inside an obtained 3D medical image; attaching a statistical atlas to the bounding box; determining search points inside the 3D medical image based on the statistical atlas; selecting a context around each of the search points based on a grid of the search points; applying a multilayered feature extraction algorithm to the selected contexts; forming a set of candidates for landmarks by computing a quality measure for each of the search points and for types of the landmarks, based on a corresponding output of the multilayered feature extraction algorithm; filtering the candidates based on the statistical atlas and pre-computed thresholds and outputting remaining candidates among the candidates based on the filtering; sorting the remaining candidates within limits of the types of the landmarks according to qualities of the landmarks; and outputting candidates, among the sorted candidates, having largest values of a quality measure or outputting a demanded number of candidates, among the sorted candidates, having the largest values of a quality measure.

The estimating of the bounding box may include using an integral projection of a 3D image onto coordinate axes.

The non-transitory computer readable recording medium may further cause the CPU to perform: forming of the statistical atlas based on positions of the landmarks in marked 3D medical images.

The selecting of the context around each of the search points may include selecting a subarea in a 3D medical image, the subarea having a center located at a predetermined point.

The selecting of the context around each of the search points may include selecting three orthogonal sections of the 3D medical image which pass through the predetermined point.

The multilayered feature extraction algorithm may include feature extraction layers, concentrating layers, and normalizing layers.

The non-transitory computer readable recording medium may further cause the CPU to perform: obtaining the multilayered feature extraction algorithm based on a learning procedure.

The learning procedure may include: preprocessing and marking a set of 3D medical images; forming a learning base based on the set of marked 3D medical images; initializing layers, responsible for feature extraction, in the multilayered feature extraction algorithm by performing learning without a teacher; and performing learning with a teacher on a model of the multilayered feature extraction algorithm, based on the set of marked 3D medical images.

The forming of the learning base may include combining precedents that do not correspond to any types of landmarks corresponding to randomly selected positions in a 3D image and precedents that correspond to landmarks corresponding to positions in a marked 3D image.

The forming of the learning base may include inserting precedents, obtained by application of spatial distortions, into the learning base.

The performing of the learning without a teacher may include searching optimum weights of layers, responsible for feature extraction, in the multilayered feature extraction algorithm, so that outputs of the multilayered feature extraction algorithm differ from outputs of corresponding sparse encoders, the sparse encoders may be obtained by an application of sparse coding, the application of the sparse coding may include searching an optimum dictionary of basic elements; and the sparse encoders may output expansion coefficients of an input based on the basic elements.

The performing of the learning with a teacher may be based on a stochastic gradient descent method.

The filtering of candidates may be performed based on statistical information obtained from the statistical atlas so as to filter candidates having statistically incorrect positions.

The non-transitory computer readable recording medium may further cause the CPU to perform: computing thresholds for the quality measure by minimizing a loss function, wherein first and second types of errors are part of the loss function.

According to another aspect of an exemplary embodiment, there is provided an apparatus configured to automatically register landmarks in three-dimensional (3D) medical images, the apparatus including: an image acquisition acquirer configured to acquire a medical image; a memory configured to store the acquired medical image; and a controller to identify landmarks in the stored medical image by generating search points, repeatedly applying a multilayered feature extraction algorithm to the search points to extract features, and identifying the landmarks based on the extracted features.

The apparatus may be configured to repeatedly apply the multilayered feature extraction algorithm to the search points until each of the search points have been scanned.

The apparatus may be further configured to filter the scanned search points based on a predetermined threshold to thereby identify the landmarks.

DETAILED DESCRIPTION OF EXEMPLARY EMBODIMENTS

In the field of processing of medical images, there are a lot of tasks that require adequate recognition of anatomic structures on investigated images. Such anatomic structures may be explained and their relative positions may be determined by using, for example, special anatomic points (landmarks) locked to such anatomic structures. Automatic obtaining of such landmarks may contribute to many procedures connected to research for medical images, such as planning of views or segmentation. An aspect of exemplary embodiments provides a method of automatically registering landmarks in a three-dimensional (3D) medical image. When this method is used, positions of unique landmarks may be output within limits of each type, and also positions of several points for each type of landmark may be output. The method may include at least one of operations illustrated in FIGS. 1A and 1B.

Figure 1A:
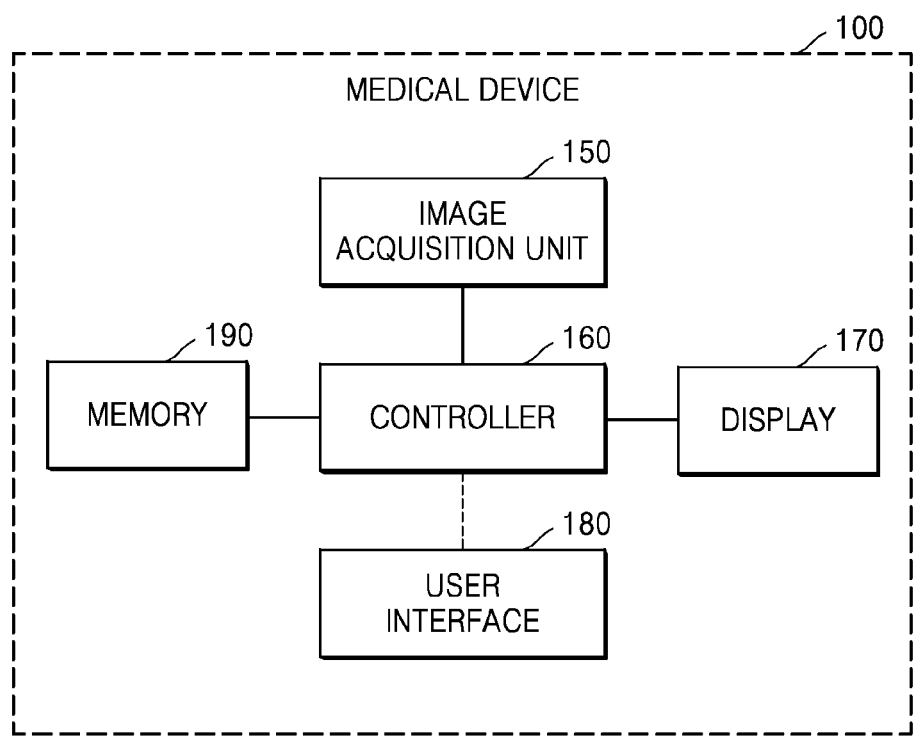
FIGS. 1A and 1B illustrate an apparatus and main operations of a method of automatically registering landmarks according to an exemplary embodiment.

Referring to FIG. 1A, a medical apparatus 100 according to an exemplary embodiment includes an image acquisition unit 150 (e.g., image acquirer) and a controller 160. The medical apparatus 100 may further include at least one selected from a display 170, a user interface 180, and a memory 190. The image acquisition unit 150 obtains a 3D image.

The controller 160 attaches a statistical atlas to a bounding box corresponding to a portion of the 3D image to determine a set of search points. Features of the determined search points are extracted. A set of candidates for at least one landmark is formed, and then filtered. Then, at least one candidate obtained by the filtering is used to output final positions of landmarks.

The display 170 may display a medical image showing the final positions of the landmarks.

The user interface 180 receives an input of a statistical atlas entered by a user. Landmarks in a medical image may be input through a user interface.

The memory 190 is connected to the controller 160 and provides a memory space for operation of a system. For example, a set of candidates for landmarks in a 3D image or a set of candidates obtained by filtering may be stored.

Hereinafter, an operation of the medical apparatus 100 will be described in detail with reference to FIGS. 1B to 5.

Figure 1B:
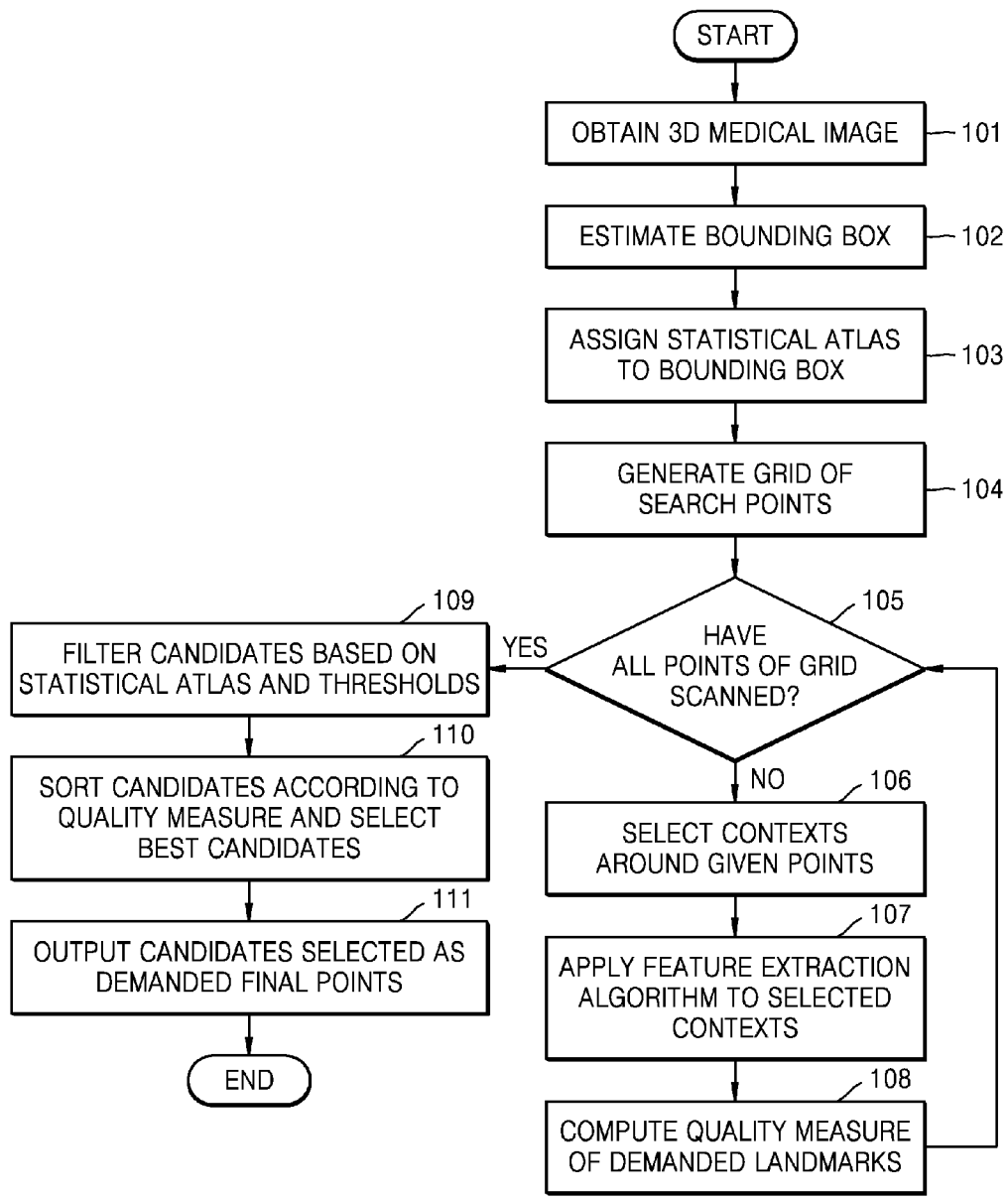

FIG. 1B illustrates a flowchart to explain a method of automatically registering landmarks in a 3D medical image according to an exemplary embodiment. The method of automatically registering landmarks in a 3D medical image includes at least one of the operations illustrated in FIG. 1B.

In operation 101, a 3D medical image is obtained. In operation 102, a bounding box is estimated with respect to a given image. In this operation, borders of a main part of a medical image, in which a space on sides of the major part is ignored, are searched. For example, regarding a magnetic resonance tomography image of a brain, the bounding box simply bounds a head, ignoring black spaces around the head. In operation 103, a statistical atlas that is pre-computed is attached to the bounding box. The attached statistical atlas is used to generate a grid of search points (future candidates for landmarks) in operation 104. Then, the main feature of an exemplary embodiment begins. In operation 105, the method determines whether all points of a grid have been scanned. If not, in operation 106, contexts around given points are selected. In operation 107, a multilayered feature extraction algorithm is applied to points of a selected grid (until the whole area is scanned, that is, the condition of operation 105 is satisfied). Actually, operation 107 executes classification of a selected context of each such point (operation 106), with a purpose to determine whether the point is a type of landmark or the point corresponds to an area that is not a landmark. However, an output of a feature extraction algorithm is indistinct. A feature output vector may be interpreted as a vector of values which are connected with probabilities of a case in which the given point belongs to a certain class (in other words, is a special type of a landmark). In operation 108, on the basis of a vector of features for types of landmarks and for a situation in which the point is not a landmark, a quality measure is computed—a pseudo-probability of a case in which this point belongs to one of these classes. Operations 105, 106, 107 and 108 are repeated until all points of a grid are scanned. Then, in operation 109, all candidates are filtered using the statistical atlas and pre-computed thresholds after processing all points belonging to a search zone. Furthermore, in operation 110, all candidates within limits of types of landmarks are sorted according to a quality measure, and in operation 111, a predetermined number of candidates with the highest value of a quality measure are outputted at the conclusion of the overall procedure as detected positions of landmarks. In the exemplary embodiment, a machine learning method is applied to construction of a multilayered feature extraction algorithm. A significant aspect of the exemplary embodiment is a procedure of a learning model of a feature extraction algorithm (see FIG. 4). The learning procedure may be executed irrespective of the main procedure of registration of landmarks. The above-mentioned operations will be described in detail.

Input data. The method, described above in connection with an exemplary embodiment, is capable of working with the 3D medical images which can be obtained by using various technologies, such as magnetic resonance tomography (MRT), computer tomography (CT), positron emission tomography (PET) and others. The method is steady enough against input images having low resolution. Images having low resolution are obtainable for a short enough time, which is an advantage.

Figure 2:
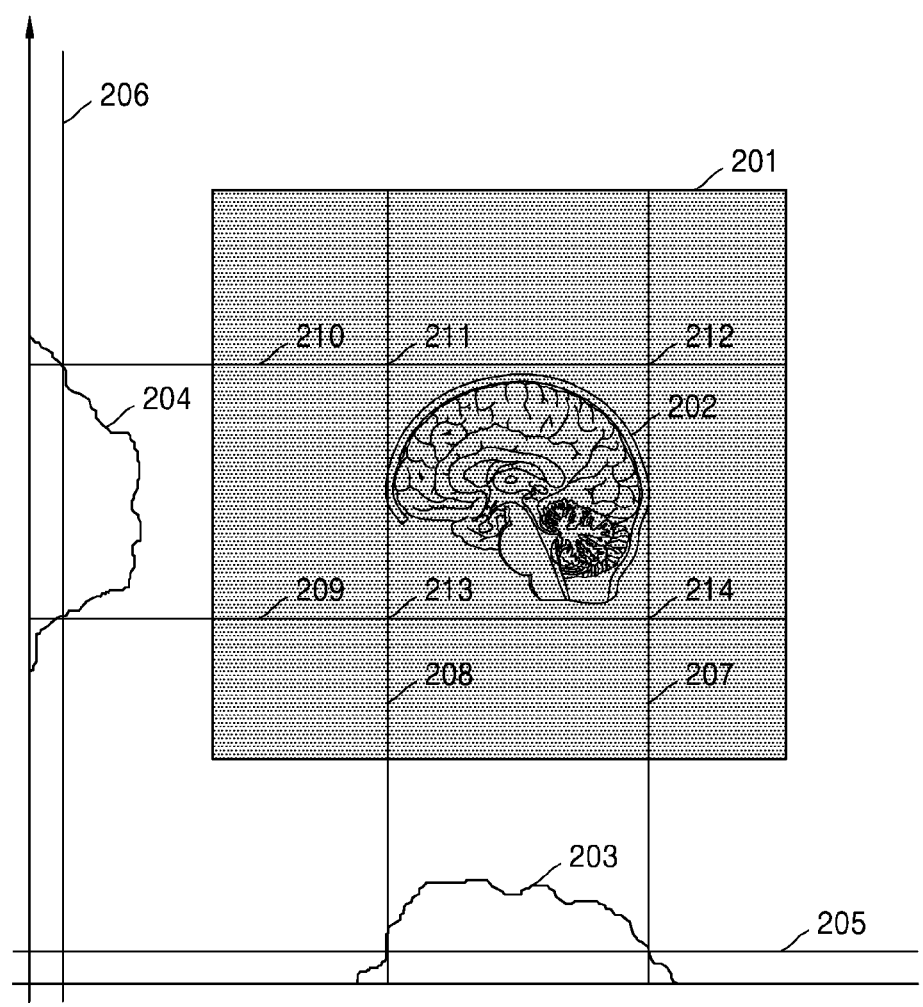
FIG. 2 illustrates an estimated bounding box according to an exemplary embodiment.

Bounding box. The method, described above in connection with an exemplary embodiment, begins with an estimation of a bounding box for the input 3D medical image (e.g., operation 102). FIG. 2 illustrates an example of an estimation of a bounding box for a two-dimensional case according to an exemplary embodiment; in a three-dimensional case computation is made similarly. The bounding box limits a main part 202 in an image of an investigated body. In this procedure, internal projections 203 and 204 of a whole image 201 on an axis of coordinates are computed, and areas in which a projection is above some thresholds 205 and 206 are searched. The bounding box may be obtained as a direct product of intervals, which are extreme points 211, 212, 213, and 214 of crossings of projections having threshold values 207, 208, 209 and 210. An integral projection of volume is a one-dimensional function in which a value in a given point equals the sum of all values in the volume, the values being taken at the points, one of which has coordinates that are fixed and equal to the given point. Due to the use of a threshold that is not zero, an area that includes noise alone may be removed from an edge of an investigated image.

Statistical atlas. The statistical atlas (e.g., operation 103) contains the information about statistical distribution of landmarks inside an investigated part of a body. The statistical atlas is constructed based on at least one marked 3D medical image. The bounding box is used to limit an area defined by scattered marked points which are obtained due to uncertainty of a position of the investigated part of a body in the investigated medical image. In some 3D medical images, positions of landmarks are transformed to positions in a local apparatus of coordinates which is assigned to a bounding box, instead of the whole volume. Then, on the basis of computed positions of landmarks, with respect to several marked medical images, a generalized spatial distribution of these landmarks is estimated. In an elementary case, this distribution may be presented by using a convex cover of all marked points (for concrete type of landmarks) in a uniform local apparatus of coordinates.

Figure 3:
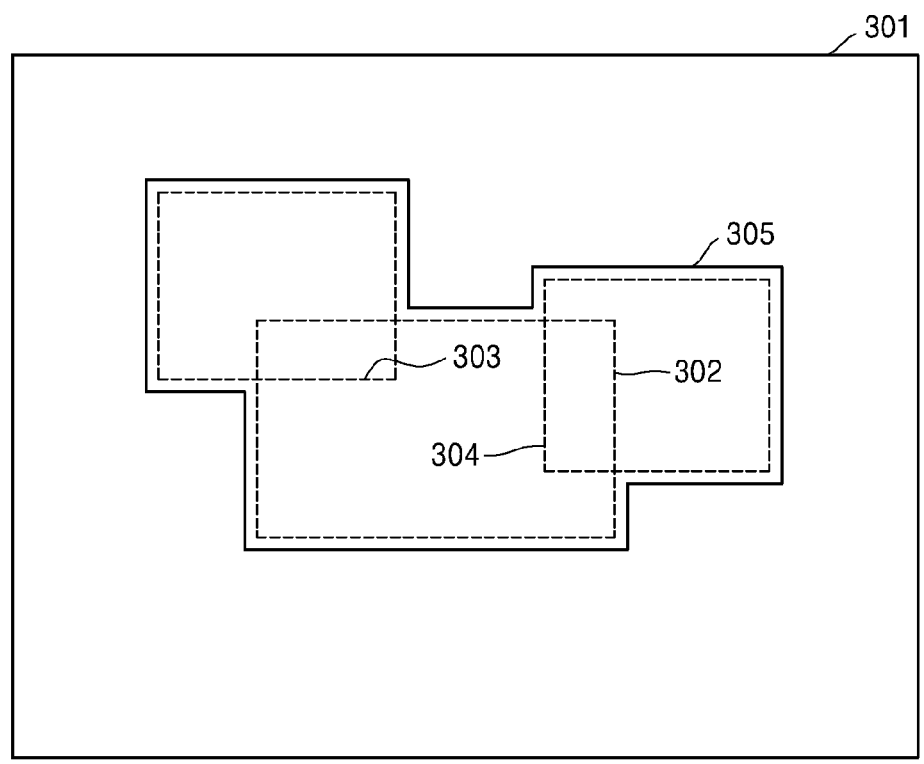
FIG. 3 illustrates a search area constructed by combining statistical distribution of various types of landmarks according to an exemplary embodiment.

Generation of a grid (Que) of search points. The grid of search points (e.g., operation 104) is a set of points in a 3D medical image, and a selected context will be submitted as input data to multilayered feature extraction algorithm. The grid is generated based on a pre-computed statistical atlas. FIG. 3 illustrates a subarea of the whole 3D medical image 301 from which search points are taken. Search points are selected from a subarea 305 which is a combination of subareas 302, 303 and 304 corresponding to a statistical distribution of landmarks for types of points. Search points are selected from a subarea according to certain operations (e.g., a distance between the next points). Such narrowing of a search area leads to an increase in a computation speed and a decrease in a possibility of occurrence of a first type of error.

Application of a multilayered feature extraction algorithm. The main part of an exemplary embodiment includes an iterative application of a multilayered feature extraction algorithm to points of a grid of search points (e.g., operation 107). The operation of feature extraction includes selecting a portion of voxel data from a context around a current point and submitting this data as input values of a multilayered feature extraction algorithm. The multilayered feature extraction algorithm is constructed by machine learning. The feature extraction algorithm generates output vectors corresponding to similar inputs. These vectors are used for computation of a quality measure for each type of landmark and a case in which a given search point does not belong to any type of landmarks. The quality measure corresponds to a possibility of a case in which a given search point represents a certain landmark or does not represent any types of landmark. An implementation of computation of a quality measure will be described. When a type of landmark, for which a computation is made, has the largest value in an output vector of a feature extraction algorithm applied to a current search point, the quality measure is equal to a difference between the largest value of an output vector and the second-largest value of an output vector. Otherwise, when a given type of landmark does not have a largest value in an output vector, the quality measure is equal to a difference between this value and the largest value from an output vector.

Filtration of results and obtaining of result. A result of an application of a feature extraction algorithm to points from a grid of search points is a set of vectors having elements which are values of the above-described measure of quality. The set of candidates for landmarks is selected for types of landmarks. Such candidates represent a combination of a position of a landmark and a corresponding quality measure. For a complete set of types of landmarks, candidates are filtered according to a possibility of a case in which a specified landmark occurs in a given position in view of a statistical atlas. An additional filtering is executed due to a pre-computed threshold, and all candidates, for which a quality measure value is below the specified threshold, are eliminated from consideration. Thresholds are pre-computed based on a set of a marked 3D medical image. Computation is performed by searching thresholds that minimize a loss function, and combining the first and second types of errors. Optimum thresholds are tested to provide a balance between the first type of error and the second type of error which have occurred during a test of results of classification on the whole available set of marked 3D medical images. This balance may be corrected by using a change in compromise parameters depending on a type of assigned task. All remaining candidates are sorted according to a quality measure within limits of one type of landmark separately from other types thereof. Then, depending on demands for types of landmarks, the claimed method may have an output of the best candidate (e.g., a candidate having the largest value of a quality measure) or a set of candidates (e.g., candidates remaining after filtration or the fixed number of candidates with the largest value of a quality measure).

Figure 4:
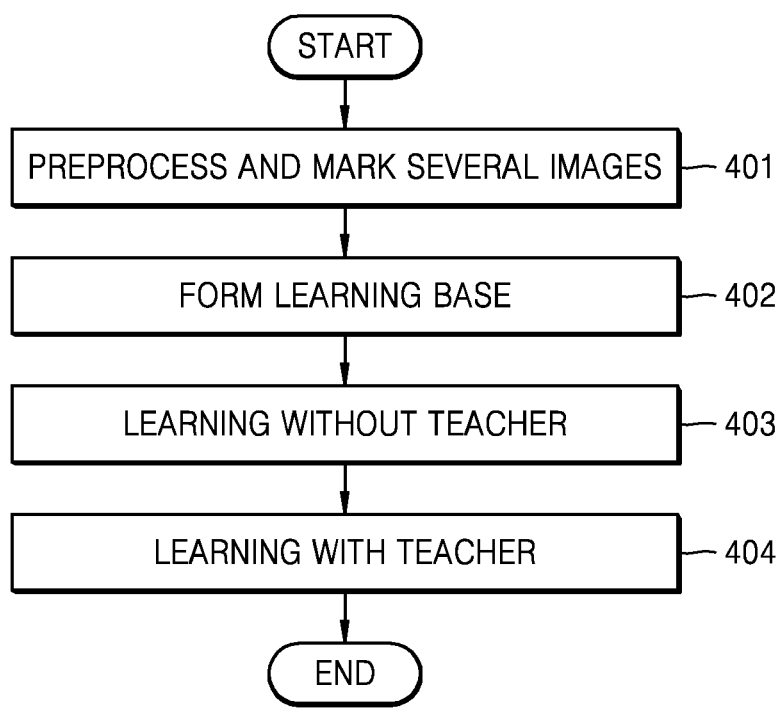
FIG. 4 illustrates main operations of learning of a multi-layered model of a feature extraction algorithm according to an exemplary embodiment.
Figure 5:
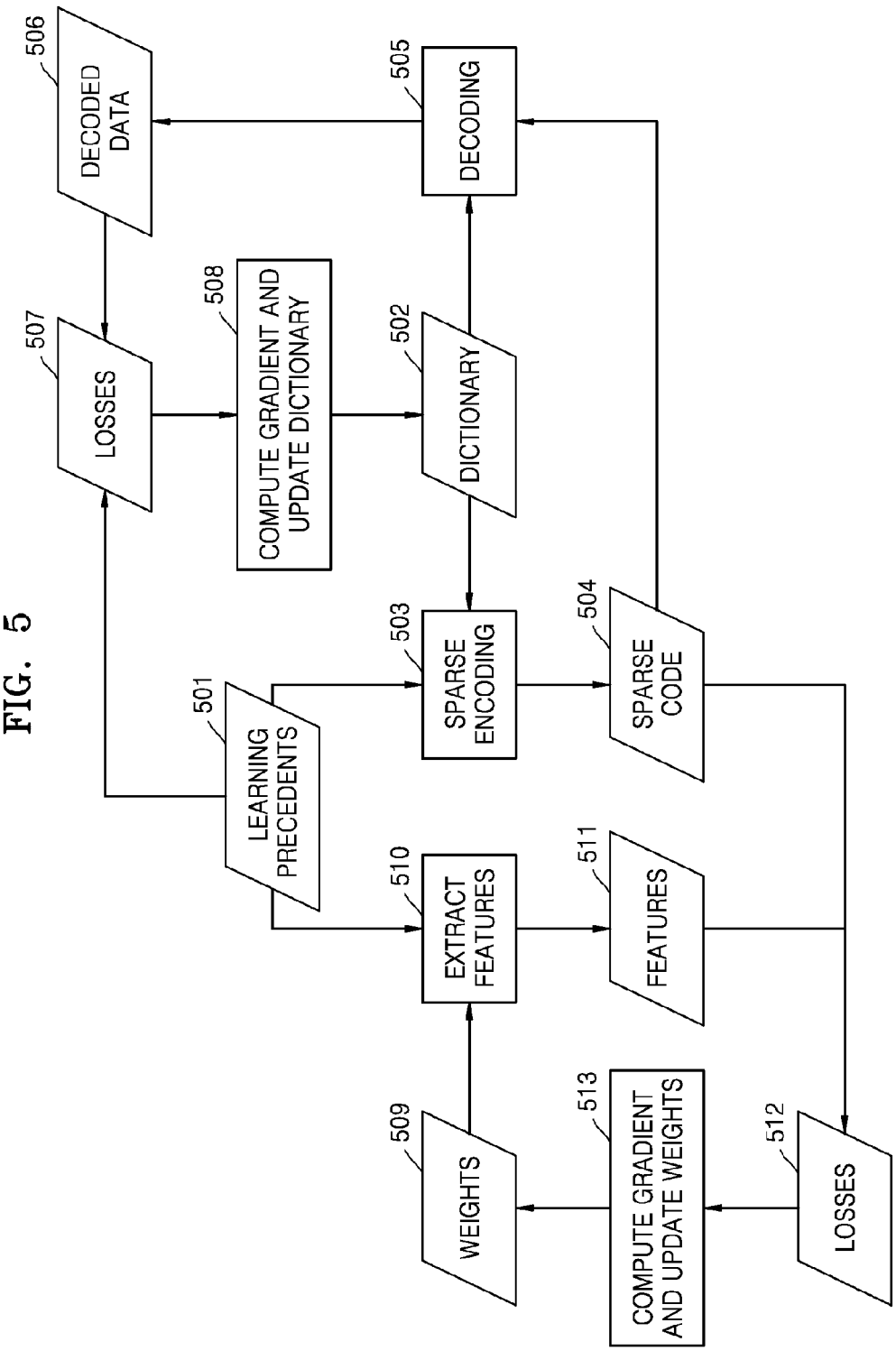
FIG. 5 illustrates a flowchart to explain a learning procedure of layers without a teacher, to extract features, according to an exemplary embodiment.

Learning of a multilayered model of feature extraction algorithm. A multilayered feature extraction algorithm is used to obtain features of contexts of search points. Layers of transformation, included in a feature extraction algorithm, contain a set of weights which define behavior or the whole algorithm. An adjustment process of these weights is based on machine learning. FIG. 4 illustrates a flowchart to explain a learning process. Several 3D medical images, from which a learning base is to be built, are used for realization of this process. First, in operation 401, these images are preprocessed in some ways and marked manually or automatically. Doctors or other experts may specify positions of landmarks marked on a selected 3D medical image. In operation 402, the learning base is additionally formed. The learning base includes precedents that correspond to some points selected from a volume. A precedent represents a combination of a mark of a class and a portion of voxel data extracted from the context around a corresponding point in volume. The learning base includes precedents corresponding to landmarks and the precedents correspond to points from a volume in which there are no anatomic structures. Last precedents correspond to points which are randomly selected from a volume and are spaced sufficiently far apart from interesting landmarks. In addition, several precedents are added to the base, the several precedents being obtained from the above-described precedents by using an application of spatial distortions thereto. This feature improves invariance of a feature extraction algorithm to variations of the input data. This feature helps a diversity learning base in a case in which only a small number of 3D medical images is available. Two stages of the model learning of a feature extraction algorithm are performed after the learning base is generated.

In a first stage (operation 403), learning without a teacher is performed by initializing weights W (element 509) and extracting features. This operation is executed on each of the layers by using a solution of the following optimizing task:

$$W = \underset{W}{\operatorname{argmin}} \sum_{y \in Y} \|z^* - F_W(y)\|^2$$

where Y is a learning base, y is an input of a layer from a learning base, z* is a sparse code for y, and $F_W$ is a function depending on W. The solution transforms the input y to a layer input.

Optimization is made by using a stochastic gradient descent. A learning precedent (element 501) is encoded in a sparse code (element 504) using a dictionary (element 502). Features (element 511) are obtained after the procedure of feature extraction in operation 510. A loss (e.g., value of a loss function) (element 512), computed based on the features (element 511) and a sparse code (element 504), is used in computing a gradient with respect to an update of values of weights W in operation 513. Computation of a sparse code with respect to any input is executed during solution of the following optimizing task in operation 503:

$$z^* = \underset{z}{\operatorname{argmin}} \|z\|_0 : y = Dz$$

where D is a dictionary, y is an input vector, z is an encoded vector (code), and z* is an optimum sparse code.

In the equation represented above, the input y is presented as a linear combination of only a small number of basic elements from dictionary D, and accordingly, the obtained code z (a vector from decomposing values) is sparse. Dictionary D may be obtained based on a learning base by learning without a teacher (without use of marks of precedents). The application of learning without a teacher to search for an optimum dictionary D is advantageous in that the dictionary is learned directly from the data. Herein, D optimally describes the latent consistencies and specific nature of used data. By doing so, there is no need to input a considerable amount of marked data for learning of dictionary. Searching of D is equivalent to a solution of the following optimizing task:

$$D = \underset{D}{\operatorname{argmin}} \sum_{y \in Y} \|Dz^* - y\|^2$$

where Y is a learning base, y is an input of a layer from learning base, z* is a sparse code for y, and D is a dictionary.

Optimization is made by using a stochastic gradient descent. Decoding of sparse code in operation 505 is performed to obtain decoded data (element 506). Losses (e.g., values of a loss function) (element 507), computed based on a learning precedent (element 501) and decoded data (element 506), are used for a gradation computation to update a value of a dictionary D (operation 508). A correction process for D is interleaved with a search of an optimum sparse code for an input y at a fixed dictionary D. After a procedure of learning without a teacher is finished, the obtained feature extraction algorithm is adjusted on a computation of multi-level sparse codes, which is a good hierarchical representation of input data.

In the next stage (operation 404), a learning model of feature extraction algorithm (operation 404) is performed. As a result, the algorithm may output features corresponding to probabilities of occurrences of any type of a landmark in a given point. Learning is performed by a solution of the following problem of optimization:

$$W = \underset{W}{\operatorname{argmin}} \sum_{y \in Y} \|x^* - G_W(y)\|^2$$

where Y is a learning base, y is an input of a feature extraction algorithm from a learning base, x* is a vector constructed based on a mark, corresponding to an input, and $G_W$ depends from W and defines full transformation of the input y in an output of a feature extraction algorithm.

During the optimization, the feature extraction algorithm is adjusted by outputting results closer to vectors, prescribed by a marking. The optimizing is also solved by using a stochastic gradient descent. At the beginning of the procedure, some weights of layers of the algorithm are initialized by values, computed at a stage of preliminary learning without a teacher. A completely constructed feature extraction algorithm may output a vector of features that is used directly for a classification task or for assigning to each class of probability that a given input belongs to a specified class.

Figure 6:
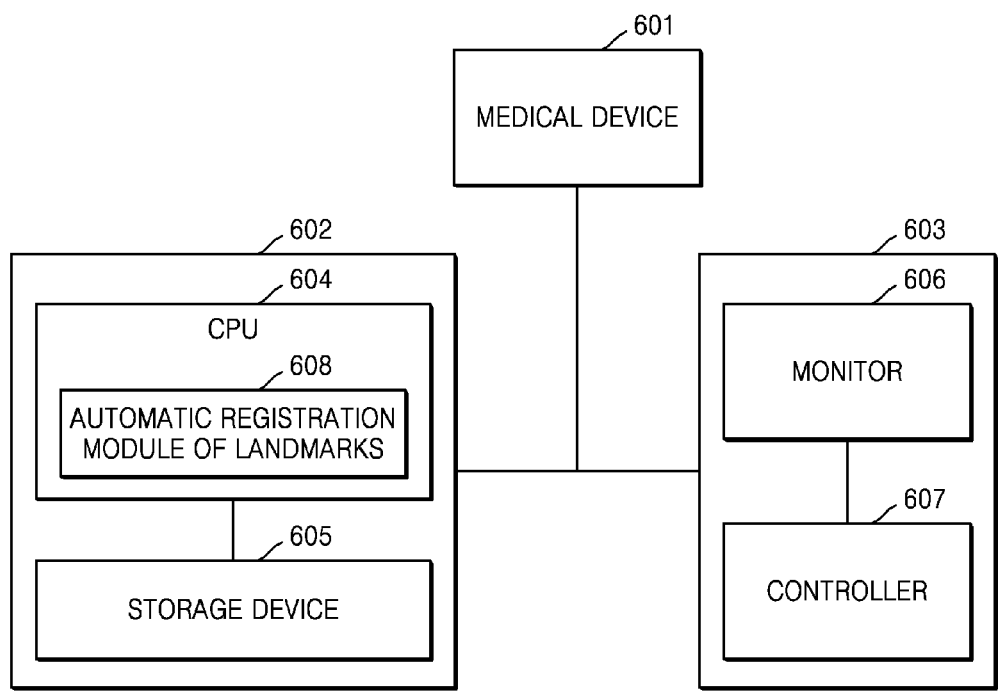
FIG. 6 illustrates an example of a system according to an exemplary embodiment.

System of automatic registration of landmarks. An example of system, in which an exemplary embodiment is embodied, is presented in FIG. 6. The system consists of a medical device (e.g., apparatus) 601 for obtaining a 3D medical image, a computer 602, and an operator's console 603. After a 3D medical image is obtained by the medical device 601, a computer file having the 3D medical image is stored in a storage device (e.g., computer memory) 605. An operator starts a program solving a specific task of medical diagnosis using a controller 607 of the console 603. The program executes on a computer CPU 604, and includes an automatic registration module of landmarks 608 as a subprogram. The result of operation of the program may be seen and analyzed on a monitor 606 of console.

Figure 7:
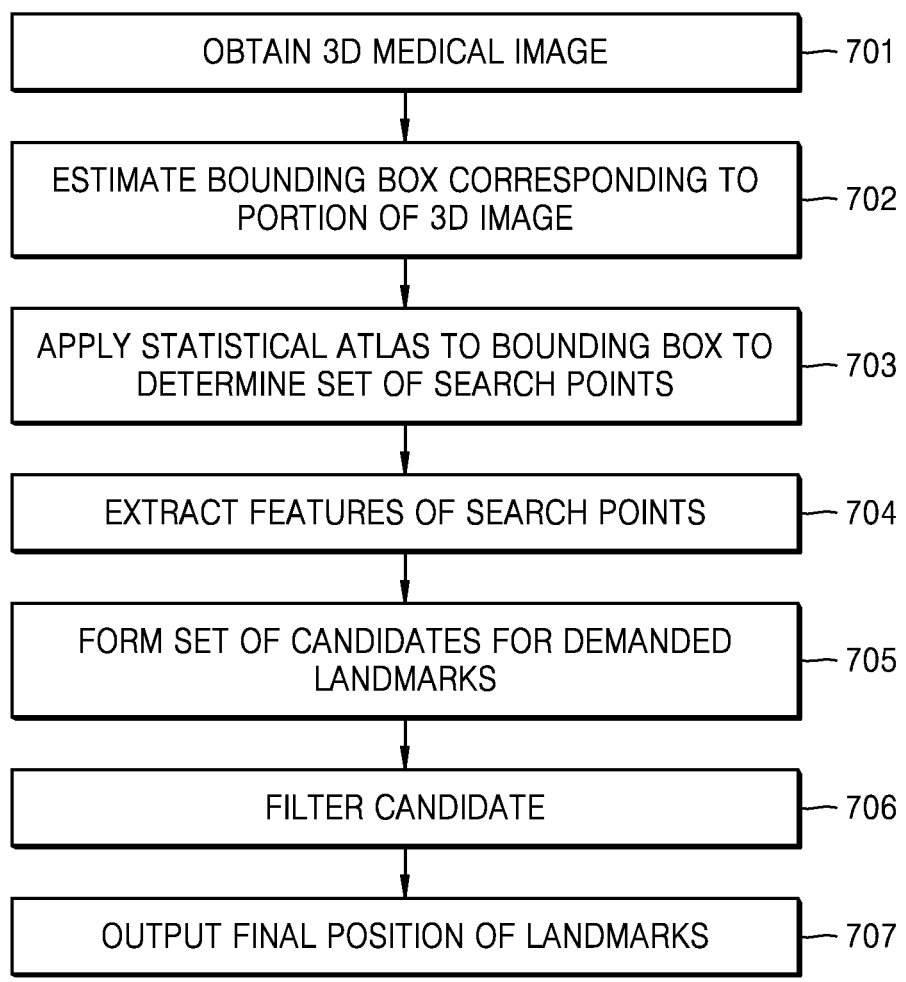
FIG. 7 illustrates an example of a method according to an exemplary embodiment.

An exemplary embodiment to obtain a 3D medical image is illustrated in FIG. 7. In operation 701, a 3D medical image is obtained. In operation 702, a bounding box corresponding to a portion of a 3D image is estimated or determined, and in operation 703, a statistical atlas is applied to the bounding box to form a set of search points. In operation 704, features of the search points are extracted. In operation 705, a set of candidates for demanded landmarks is formed. In operation 706, Thereafter, each of the candidates is filtered, and according to the result of filtering, in operation 707, a final point of at least one landmark is output.

A method, described above in connection with an exemplary embodiment, may be included as one of several stages in many procedures, connected with processing of diagnostic type medical images, and may be implemented in the form of a software or independent system as a part of the used medical device.

An apparatus according to exemplary embodiments may include a processor, a memory for storing program data and executing the program data, a permanent storage unit such as a disk drive, a communications port for handling communications with external devices, and user interface devices, including a touch panel, keys, buttons, etc. When software modules or algorithms are involved, these software modules may be stored as program instructions or computer-readable codes executable on a processor on a computer-readable recording medium. Examples of the computer-readable recording medium include magnetic storage media (e.g., ROM, RAM, floppy disks, hard disks, etc.), and optical recording media (e.g., CD-ROMs, digital versatile disks (DVDs), etc.). The computer-readable recording medium can also be distributed over network coupled computer systems so that the computer-readable code is stored and executed in a distributive manner. This media can be read by the computer, stored in the memory, and executed by the processor.

The exemplary embodiments may be implemented as functional block components and various processing steps. Such functional blocks may be realized by any number of hardware and/or software components configured to perform the specified functions. For example, exemplary embodiments may employ various integrated circuit (IC) components, e.g., memory elements, processing elements, logic elements, look-up tables, and the like, which may carry out a variety of functions under the control of one or more microprocessors or other control devices. Similarly, where the elements of exemplary embodiments are implemented using software programming or software elements, exemplary embodiments may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, exemplary embodiments could employ any number of conventional techniques for electronics configuration, signal processing and/or control, data processing and the like. The words "mechanism," "element," "means," and "configuration" are used broadly and are not limited to mechanical or physical exemplary embodiments, but can include software routines in conjunction with processors, etc.

The particular implementations shown and described herein are illustrative examples of exemplary embodiments and are not intended to otherwise limit the scope of the exemplary embodiments in any way. For the sake of brevity, conventional electronics, control systems, software development and other functional aspects of the systems may not be described in detail. Furthermore, the connecting lines, or connectors shown in the various presented figures, are intended to represent exemplary functional relationships and/or physical or logical couplings between the various elements. It should be noted that many alternative or additional functional relationships, physical connections or logical connections may be present in a practical device.

The use of the terms "a" and "an" and "the" and similar referents in the context of describing exemplary embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. Exemplary embodiments are not limited to the described order of the steps. The use of any and all examples, or exemplary language (e.g., "such as") provided herein, is intended merely to better illuminate exemplary embodiments and does not pose a limitation on the scope of the exemplary embodiments. Numerous modifications and adaptations will be readily apparent to one of ordinary skill in the art without departing from the spirit and scope of the exemplary embodiments.

The invention claimed is:

1. A method of automatically registering landmarks in a 3-dimensional (3D) medical image of an object, the method comprising:
    obtaining a 3D image;
    determining a set of search points based on a statistical atlas attached to a bounding box corresponding to a part of the 3D image, the statistical atlas comprising information indicating a statistical distribution of previously identified landmarks in the object;
    extracting features of the determined set of search points;
    forming a set of candidates for a landmark based on the extracted features;
    filtering the candidates and outputting remaining candidates among the candidates based on the filtering; and
    outputting a final position of the landmark based on one of the remaining candidates.

2. The method of claim 1, wherein:
    the determining of the set of search points comprises setting a grid of search points inside the 3D image based on the statistical atlas.

3. The method of claim 1, wherein:
    the extracting of the features of the determined set of search points comprises:
        selecting a context around each of the search points, and
        applying a multilayered feature extraction algorithm to the context.

4. The method of claim 3, wherein:
    the forming of the set of candidates comprises computing a type of each of the landmarks and a quality measure with respect to each of the search points based on an output of the multilayered feature extraction algorithm.

5. The method of claim 1, wherein:
    the filtering of the candidates comprises filtering the candidates based on the statistical atlas and pre-computed thresholds for a quality measure indicating a probability that a search point belongs to a landmark.

6. The method of claim 1, wherein the outputting of the final position comprises:
    sorting the remaining candidates, remaining after the filtering, within limits of types of landmarks, according to qualities of the remaining candidates, and
    outputting candidates, among the sorted candidates, having largest values of a quality measure or a determined number of candidates, among the sorted candidates having the largest values of a quality measure.

7. The method of claim 1, further comprising:
    estimating the bounding box based on integral projection of a 3D image onto coordinate axes.

8. The method of claim 3, wherein:
    the selecting of the context around each of the search points comprises selecting a subarea in the 3D image, the subarea having a center located at a predetermined point.

9. The method of claim 8, wherein:
    the selecting of the context around each of the search points comprises selecting three orthogonal sections of the 3D image which pass through the given point.

10. The method of claim 3, wherein
    the multilayered feature extraction algorithm is obtained based on a learning procedure,
    wherein the learning procedure comprises:
        preprocessing and marking a set of 3D medical images;

forming a learning base based on the set of marked 3D medical images;

initializing layers, responsible for extraction of features, in the multilayered feature extraction algorithm by performing learning without a teacher; and performing learning with a teacher on a model of the multilayered feature extraction algorithm based on the set of marked 3D medical images.

11. The method of claim 10, wherein:

the forming of the learning base comprises inserting precedents, obtained by application of spatial distortions, into the learning base.

12. The method of claim 1, wherein:

the filtering of candidates is performed based on statistical information obtained from the statistical atlas.

13. An apparatus configured to perform automatic registration of landmarks in a 3D medical image of an object, the apparatus comprising:

a memory configured to store a program; and a processor connected to the memory, the processor being configured to execute the program and thereby cause the apparatus to: estimate a bounding box corresponding to an investigated part of a body inside an obtained 3D medical image, attach a statistical atlas to the bounding box, the statistical atlas comprising information indicating a statistical distribution of previously identified landmarks in the object, determine search points inside the obtained 3D medical image based on the statistical atlas; select a context around each of the search points based on a grid of the search points, apply a multilayered feature extraction algorithm to the selected context, form a set of candidates for landmarks by computing a quality measure for each of the search points and for types of the landmarks, based on a corresponding output of the multilayered feature extraction algorithm, filter the candidates based on the statistical atlas and pre-computed thresholds and output remaining candidates among the candidates based on the filtering, sort the remaining candidates within limits of each type of the landmarks according to qualities of the landmarks, and output candidates, among the sorted candidates, having largest values of a quality measure or output a demanded number of candidates, among the sorted candidates, having the largest values of a quality measure.

14. The apparatus of claim 13, wherein:

the processor is configured to execute the program and thereby cause the apparatus to estimate the bounding box based on integral projection of a 3D image onto coordinate axes.

15. The apparatus of claim 13, wherein the processor is configured to execute the program and thereby cause the apparatus to select the context around each of the search points by selecting a subarea in a 3D medical image, the subarea having a center located at a predetermined point.

16. The apparatus of claim 15, wherein:

the processor is configured to execute the program and thereby cause the apparatus to select the context around each of the search points by selecting three orthogonal sections of the 3D medical image which pass through the predetermined point.

17. The apparatus of claim 13, wherein the multilayered feature extraction algorithm is obtained based on a learning procedure, wherein the learning procedure comprises:

preprocessing and marking a set of 3D medical images;

forming a learning base based on the set of marked 3D medical images;

initializing layers, responsible for feature extraction, in a feature extraction algorithm by performing learning without a teacher; and performing learning with a teacher on a model of the multilayered feature extraction algorithm, using the marked set of 3D medical images.

18. The apparatus of claim 17, wherein the processor is configured to execute the program and thereby cause the apparatus to form the learning base by inserting precedents, obtained by application of spatial distortions, into the learning base.

19. The apparatus of claim 13, wherein:

the processor is configured to execute the program and thereby cause the apparatus to filter the candidates based on statistical information obtained from the statistical atlas so as to filter candidates having statistically incorrect positions.

20. A non-transitory computer readable recording medium comprising instructions which, when executed by a computer for automatic registration of landmarks in 3D medical images of an object, cause a CPU of the computer to execute a method comprising:

estimating a bounding box corresponding to an investigated part of a body inside an obtained 3D medical image;

attaching a statistical atlas to the bounding box, the statistical atlas comprising information indicating a statistical distribution of previously identified landmarks in the object;

determining search points inside the 3D medical image based on the statistical atlas;

selecting a context around each of the search points based on a grid of the search points;

applying a multilayered feature extraction algorithm to the selected contexts;

forming a set of candidates for landmarks by computing a quality measure for each of the search points and for types of the landmarks, based on a corresponding output of the multilayered feature extraction algorithm;

filtering the candidates based on the statistical atlas and pre-computed thresholds and outputting remaining candidates among the candidates based on the filtering;

sorting the remaining candidates within limits of the types of the landmarks according to qualities of the landmarks; and outputting candidates, among the sorted candidates, having largest values of a quality measure or outputting a demanded number of candidates, among the sorted candidates, having the largest values of a quality measure.

* * * * *